United States Patent
Zhou et al.

(10) Patent No.: US 10,538,284 B2
(45) Date of Patent: Jan. 21, 2020

(54) DEVICE FOR AUTOMATICALLY ASSEMBLING HINGE

(71) Applicant: Guangdong Lyric Robot Intelligent Automation Co., Ltd., Guangdong (CN)

(72) Inventors: Junxiong Zhou, Guangdong (CN); Junhao Zhou, Guangdong (CN); Junjie Zhou, Guangdong (CN)

(*) Notice: Subject to any disclaimer, the term of this patent is extended or adjusted under 35 U.S.C. 154(b) by 231 days.

(21) Appl. No.: 15/782,868

(22) Filed: Oct. 13, 2017

(65) Prior Publication Data
US 2019/0047644 A1 Feb. 14, 2019

(30) Foreign Application Priority Data
Aug. 9, 2017 (CN) .......................... 2017 1 0673089

(51) Int. Cl.
| | |
|---|---|
| B23P 19/04 | (2006.01) |
| B23P 21/00 | (2006.01) |
| B21J 15/28 | (2006.01) |
| B21J 15/32 | (2006.01) |
| B62D 65/02 | (2006.01) |
| E05D 9/00 | (2006.01) |
| E05D 3/12 | (2006.01) |

(52) U.S. Cl.
CPC .............. *B62D 65/02* (2013.01); *B21J 15/28* (2013.01); *B21J 15/32* (2013.01); *B23P 19/04* (2013.01); *B23P 21/006* (2013.01); *E05D 9/00* (2013.01); *B23P 2700/50* (2013.01); *E05D 3/127* (2013.01); *E05Y 2800/45* (2013.01); *Y10T 29/4994* (2015.01); *Y10T 29/49915* (2015.01); *Y10T 29/49956* (2015.01); *Y10T 29/5307* (2015.01); *Y10T 29/53048* (2015.01)

(58) Field of Classification Search
CPC ........ B62D 65/02; B23P 19/04; B23P 21/006; B23P 2700/50; B21J 15/28; B21J 15/32; E05D 9/00; E05Y 2800/45; Y10T 29/5307; Y10T 29/53048; Y10T 29/49915; Y10T 29/49956; Y10T 29/4994
See application file for complete search history.

(56) References Cited

U.S. PATENT DOCUMENTS

| | | | | |
|---|---|---|---|---|
| 3,825,988 A | * | 7/1974 | Hardick | ...................... F16J 9/10 29/564.2 |
| 4,258,459 A | * | 3/1981 | Cantini | ................... B23P 19/04 29/33 J |
| 5,072,495 A | * | 12/1991 | Kautt | .................... B23P 21/004 29/11 |

* cited by examiner

*Primary Examiner* — Bayan Salone
(74) *Attorney, Agent, or Firm* — Prakash Nama; Global IP Services, PLLC (57) ABSTRACT

Disclosed is a device for automatically assembling a hinge, comprising a connecting piece module assembly device, an adjustment sheet module assembly device, a main body bracket module assembly device, and a finished hinge product assembly device, wherein the connecting piece module assembly device is used for assembling a connecting piece module; the adjustment sheet module assembly device is used for riveting an adjustment sheet module; the main body bracket module assembly device is used for assembling a main body bracket, a main body bracket bolt, and a screw into a main body bracket module; and the high finished product assembly device is used for assembling the connecting piece module, the adjustment sheet module, the main body bracket module, and other materials into a finished hinge product. The device for automatically assembling a hinge of the present invention is used for the automatic assembly of a hinge.

8 Claims, 8 Drawing Sheets

DEVICE FOR AUTOMATICALLY ASSEMBLING HINGE

BACKGROUND OF THE INVENTION

The present invention relates to the technical field of hinge production, in particular to a device for automatically assembling a hinge.

Hinge is a necessary component of an automobile, and has a great demand. However, the existing hinge production mode is: an operator operates a single workstation on an auxiliary platform to complete a process step, and then the semi-finished hinge is conveyed to the next workstation via a conveyor belt to complete the next process step. Such a production mode has the problems of potential safety hazard and low production efficiency.

BRIEF SUMMARY OF THE INVENTION

The technical problem to be solved by the present invention is providing a device for automatically producing a hinge.

To achieve the above object, the present invention provides a device for automatically assembling a hinge, comprising a connecting piece module assembly device, an adjustment sheet module assembly device, a main body bracket module assembly device, and a finished hinge product assembly device, wherein the connecting piece module assembly device is used for assembling a connecting piece, a shaft sleeve, and a connecting piece pin into a connecting piece module; the adjustment sheet module assembly device is used for riveting an adjustment sheet and an adjustment sheet pin into an adjustment sheet module; the main body bracket module assembly device is used for assembling a main body bracket, a main body bracket bolt, and a screw into a main body bracket module; and the high finished product assembly device is used for assembling the connecting piece module, the adjustment sheet module, the main body bracket module, and other materials into a finished hinge product.

Further, the connecting piece module assembly device comprises a shaft sleeve feeding vibration disc, a connecting piece feeding vibration disc, a shaft sleeve riveting press, a shaft sleeve press-fit detector, a connecting piece pin feeding vibration disc, a connecting piece module discharging track, and a first rotating disc, wherein the shaft sleeve feeding vibration disc, the connecting piece feeding vibration disc, the shaft sleeve riveting press, the shaft sleeve press-fit detector, the connecting piece pin feeding vibration disc, and the connecting piece module discharging track are all connected to the first rotating disc; and the first rotating disc is provided thereon with a plurality of jigs.

Further, the adjustment sheet module assembly device comprises an adjustment sheet fixing pin feeding vibration disc, an adjustment sheet feeding vibration disc, an adjustment sheet fixing pin riveting press, an adjustment sheet fixing pin press-fit detector, and an adjustment sheet module discharging track, wherein the fixing pin feeding vibration disc, the adjustment sheet feeding vibration disc, the adjustment sheet fixing pin press-fit detector, and the adjustment sheet module discharging track are all connected to the adjustment sheet fixing pin riveting press.

Further, the main body bracket module assembly device comprises a main body bracket feeding device, a main body bracket rivet feeding vibration disc, a main body bracket rivet riveting press, a screw feeding vibration disc, a screw lock-fitting device, a riveting press and lock-fit detection device, a main body bracket module discharging track, and a second rotating disc, wherein the bracket feeding device, the main body bracket rivet feeding vibration disc, the main body bracket rivet riveting press, the screw feeding vibration disc, the screw lock-fitting device, the riveting press and lock-fit detection device, and the main body bracket module discharging track are all connected to the second rotating disc; and the second rotating disc is provided thereon with a plurality of jigs.

Further, the finished hinge product assembly device comprises a center pin and connecting piece pin riveting press, a release pin feeding vibration disc, a center pin feeding vibration disc, a threaded stud feeding vibration disc, an adjustment sheet fixing pin feeding vibration disc, an adjustment sheet module feeding vibration disc, a multi-functional riveting press, a multi-functional riveting press test device, a release connecting piece function test device, a center pin function test device, a discharging track and a third rotating disc, wherein the center pin and connecting piece pin riveting press, the release pin feeding vibration disc, the center pin feeding vibration disc, the threaded stud feeding vibration disc, the adjustment sheet fixing pin feeding vibration disc, the adjustment sheet module feeding vibration disc, the multi-functional riveting press, the multi-functional riveting press test device, the release connecting piece function test device, the center pin function test device and the discharging track are all connected to the third rotating disc; and the third rotating disc is provided thereon with a plurality of jigs.

Further, the third rotating disc is further provided with a plurality of feeding stations; the feeding stations are used for feeding the connecting piece module, the main body bracket module, a cover plate bracket, a main body connecting piece, the center pin, a spring pin, a release connecting piece, and a release spring.

Further, the shaft sleeve press-fit detector, the adjustment sheet fixing pin press-fit detector, the riveting press and lock-fit detection device, and the multi-functional riveting press test device are all provided with a CCD imaging visual system, a displacement sensor, and a pressure sensor.

Further, the screw lock-fitting device comprises a fixture, a cuspidate guide mechanism, and an electric screwdriver, wherein the cuspidate guide mechanism installs a screw into the fixture; and the electric screwdriver completes the lock-fit of the electric screwdriver.

Further, the center pin and connecting piece pin riveting press comprises a displacement sensor, a proximity sensor, and a hard limit device.

The present invention mainly realizes the following beneficial effects: the present invention provides a device for automatically assembling a hinge, thus improving work efficiency and ensuring the safety of an operator; the present invention adopts a vibration disc to feed materials, thus avoiding possible material feeding interruption due to manual feeding which reduces yield; the riveting press is provided with a displacement sensor, a proximity sensor, and a hard limit device, totally triple protections, thus ensuring the materials to be riveted at proper positions, and improving good product rate; and the present invention detects the riveting press effect via a CCD, a high precision displacement sensor, and a pressure sensor, thus ensuring product quality.

Explanation on the marks in figures: 11—shaft sleeve feeding vibration disc, 12—connecting piece feeding vibration disc, 13—shaft sleeve riveting press, 14—shaft sleeve press-fit detector, 15—connecting piece pin feeding press-fit device, 16—connecting piece module discharging track, 17—first rotating disc, 21—adjustment sheet fixing pin feeding vibration disc, 22—adjustment sheet feeding vibration disc, 23—adjustment sheet fixing pin riveting press, 24—adjustment sheet fixing pin press-fit detector, 25—adjustment sheet module discharging track, 31—main body bracket feeding device, 32—main body bracket rivet feeding vibration disc, 33—main body bracket rivet riveting press, 34—screw feeding vibration disc, 35—screw lock—fitting device, 36—riveting press and lock—fit detection device, 37—main body bracket module discharging track, 38—second rotating disc, 41—connecting piece module and main body bracket module feeding station, 42—cover plate bracket, main body connecting piece and center pin feeding station, 43—spring spin, release connecting piece and release spring feeding station, 44—center pin and connecting piece pin riveting press, 45—release pin feeding vibration disc, 46—center pin feeding vibration disc, 47—threaded stud feeding vibration disc, 48—adjustment sheet fixing pin feeding vibration disc, 49—adjustment sheet module feeding vibration disc, 50—multi-functional riveting press, 51—multi-functional riveting press test device, 52—release connecting piece function test device, 53—center pin function test device, 54—discharging track, 55—third rotating disc The figures are used for illustrative purpose only, but should not be considered as a limitation of the present patent. To describe the embodiment still better, certain components in the figures may be omitted, enlarged or minified, and do not denote the sizes of a practical product. For a person skilled in the art, omitting certain commonly known structures in the figures and the descriptions thereof is understandable. The same or similar marks correspond to the same or similar components. The words for describing position relationships in the figures are used for illustrative purpose only, but should not be considered as a limitation of the present patent.

DETAILED DESCRIPTION OF THE INVENTION

To facilitate the understanding of a person skilled in the art, the present invention will be elaborated hereafter in connection with the drawings and an embodiment.

Embodiment 1

A device for automatically assembling a hinge, comprising a connecting piece module assembly device, an adjustment sheet module assembly device, a main body bracket module assembly device, and a finished hinge product assembly device.

Figure 2:
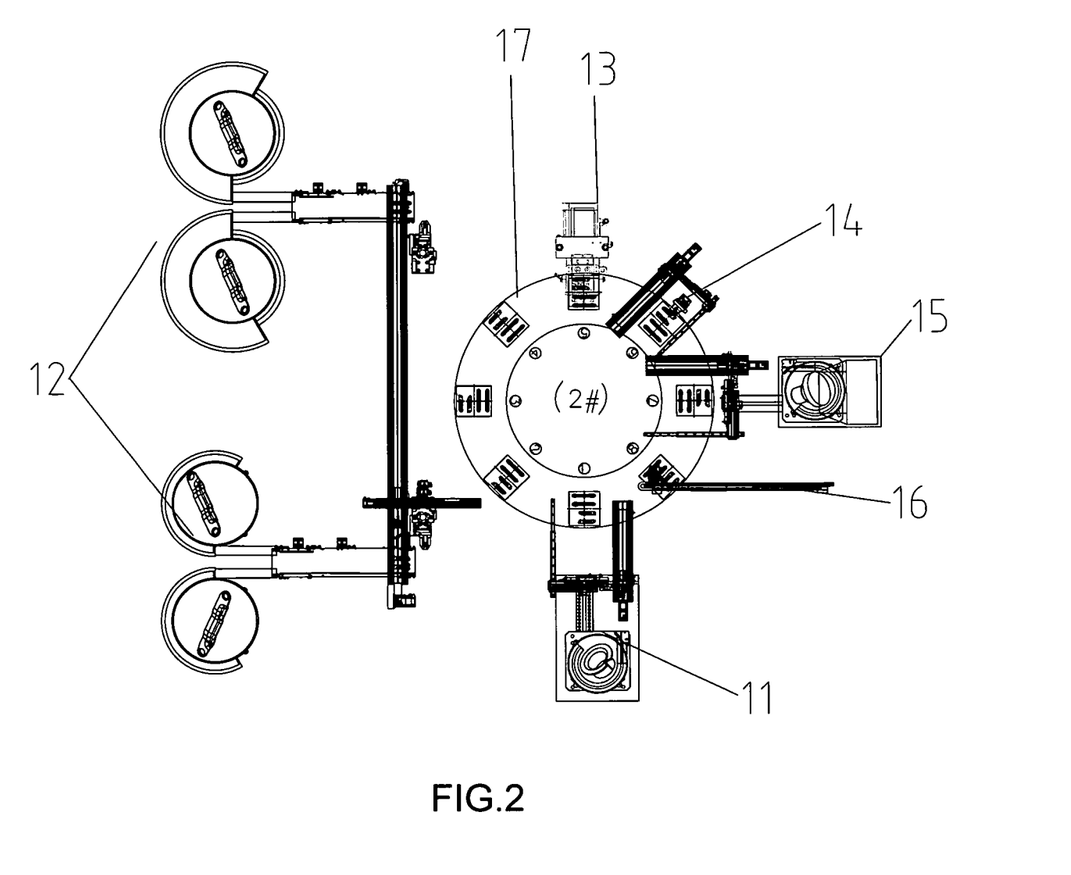
FIG. 2 is a schematic view of the connecting piece module assembly device.

With reference to FIG. 2, the connecting piece module assembly device comprises a shaft sleeve feeding vibration disc 11, a connecting piece feeding vibration disc 12, a shaft sleeve riveting press 13, a shaft sleeve press-fit detector 14, a connecting piece pin feeding press-fit device 15, a connecting piece module discharging track 16, and a first rotating disc 17, wherein the shaft sleeve feeding vibration disc 11, the connecting piece feeding vibration disc 12, the shaft sleeve riveting press 13, the shaft sleeve press-fit detector 14, the connecting piece pin feeding press-fit device 15, and the connecting piece module discharging track 16 are installed as specified on corresponding stations of the first rotating disc 17; and the first rotating disc 17 is provided thereon with a plurality of jigs for placing the shaft sleeve, the connecting piece, the connecting piece pin and the connecting piece module, and drives the materials or semi-finished products in the jigs to rotate to the next station.

Figure 4:
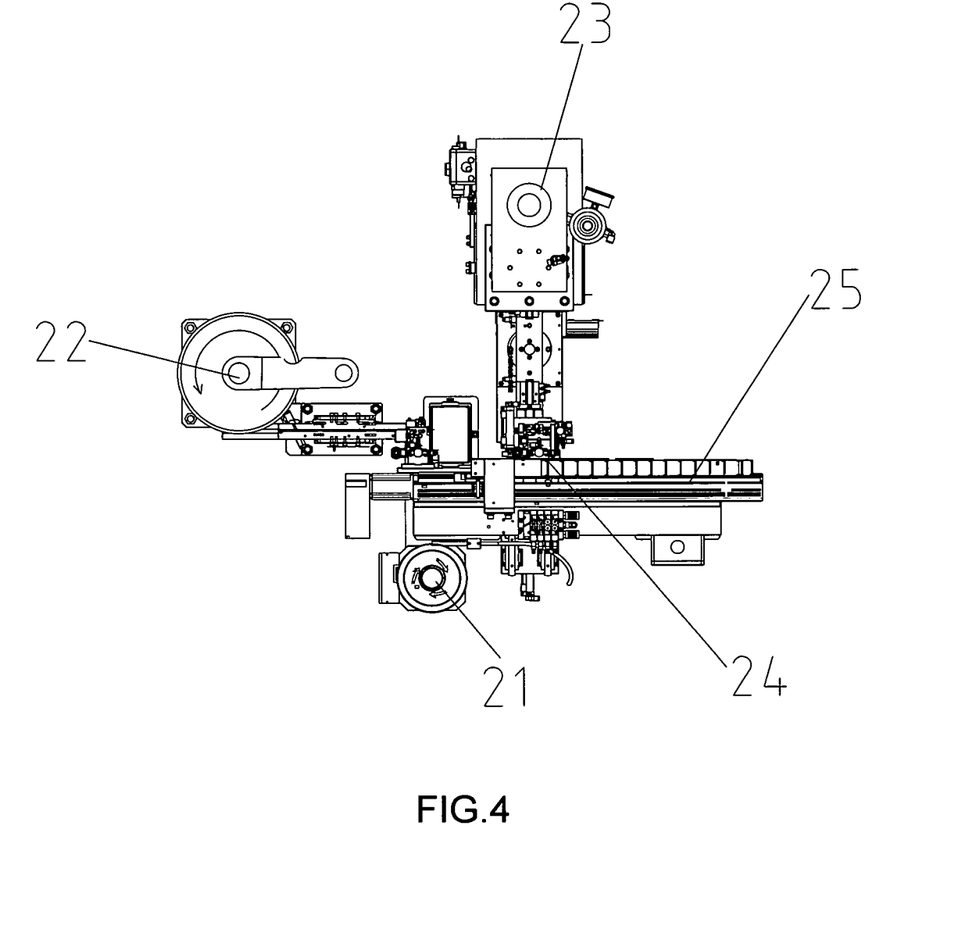
FIG. 4 is a schematic view of the adjustment sheet module assembly device.

With reference to FIG. 4, the adjustment sheet module assembly device comprises an adjustment sheet fixing pin feeding vibration disc 21, an adjustment sheet feeding vibration disc 22, an adjustment sheet fixing pin riveting press 23, an adjustment sheet fixing pin press-fit detector 24, and an adjustment sheet module discharging track 25, wherein the fixing pin feeding vibration disc 21, the adjustment sheet feeding vibration disc 22, the adjustment sheet fixing pin press-fit detector 24, and the adjustment sheet module discharging track 25 are connected to the corresponding positions of the adjustment sheet fixing pin riveting press 23.

Figure 6:
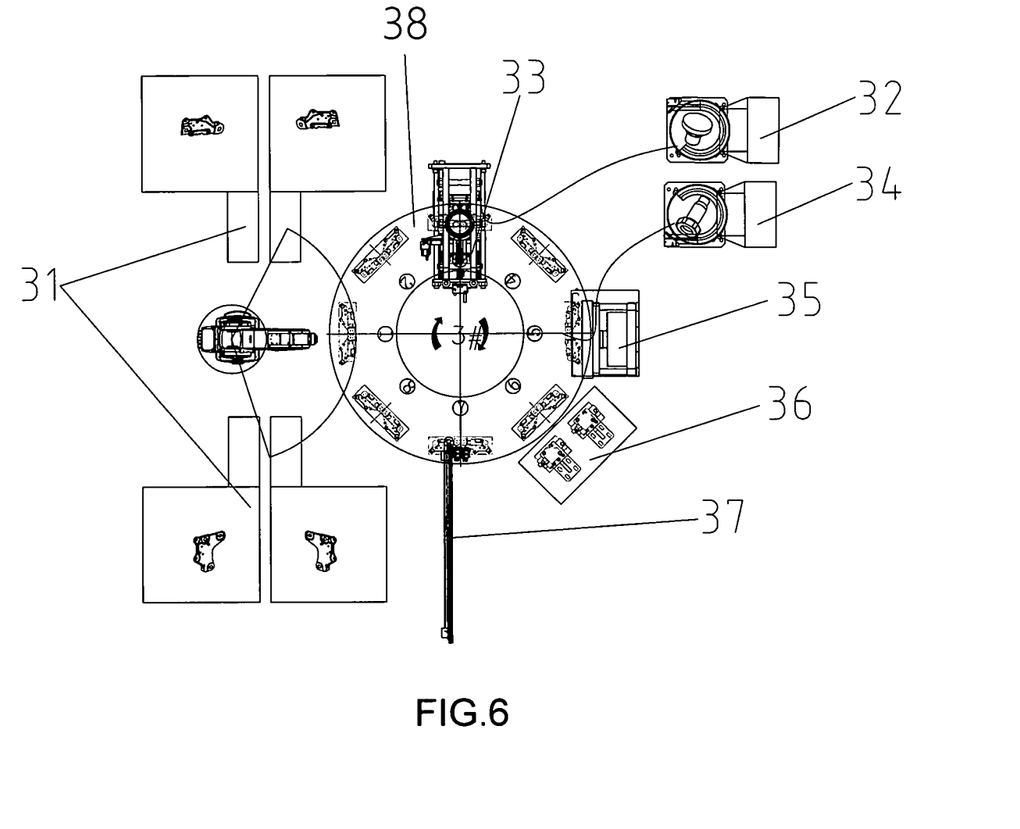
FIG. 6 is a schematic view of the main body bracket module assembly device.

With reference to FIG. 6, the main body bracket module assembly device comprises a main body bracket feeding device 31, a main body bracket rivet feeding vibration disc 32, a main body bracket rivet riveting press 33, a screw feeding vibration disc 34, a screw lock-fitting device 35, a riveting press and lock-fit detection device 36, a main body bracket module discharging track 37, and a second rotating disc 38, wherein the bracket feeding device 31, the main body bracket rivet feeding vibration disc 32, the main body bracket rivet riveting press 33, the screw feeding vibration disc 34, the screw lock-fitting device 35, the riveting press and lock-fit detection device 36, and the main body bracket module discharging track 37 are connected to corresponding stations at specified positions on the second rotating disc 38; and the second rotating disc 38 is provided thereon with a plurality of jigs for placing the main body bracket, the main body bracket rivet, the screw and the main body bracket module, and drives the materials or semi-finished products in the jigs to rotate to the next station. The screw lock-fitting device 35 comprises a fixture, a cuspidate guide mechanism, and an electric screwdriver, wherein the cuspidate guide mechanism installs a screw into the fixture; and the electric screwdriver completes the lock-fit of the electric screwdriver.

Figure 8:
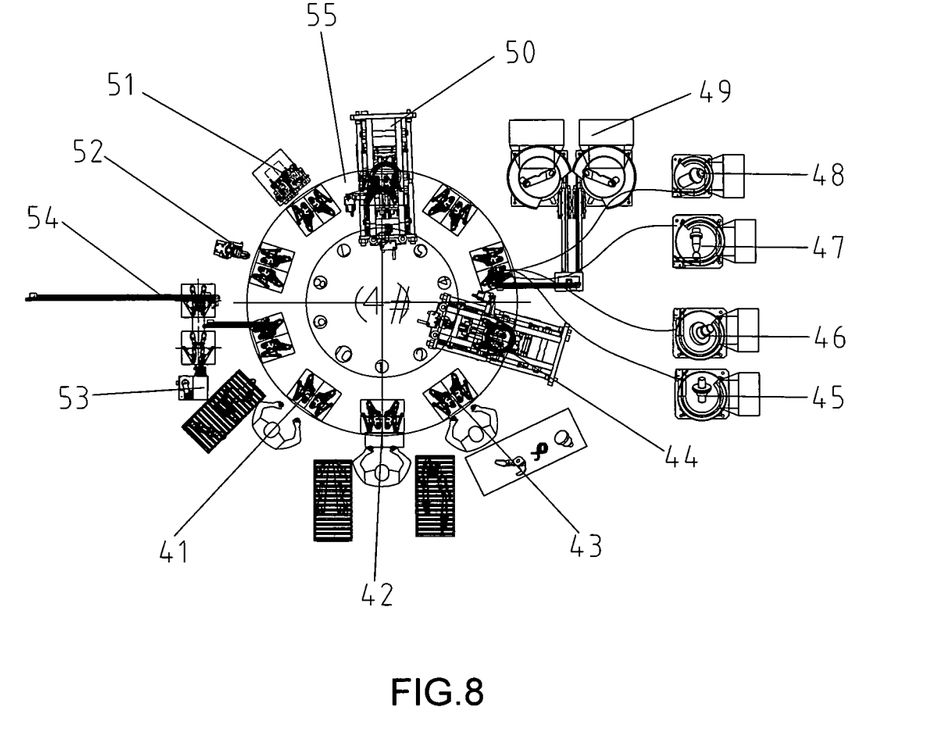
FIG. 8 is a schematic view of the finished hinge product assembly device.

With reference to FIG. 8, the finished hinge product assembly device comprises a center pin and connecting piece pin riveting press 44, a release pin feeding vibration disc 45, a center pin feeding vibration disc 46, a threaded stud feeding vibration disc 47, an adjustment sheet fixing pin feeding vibration disc 48, an adjustment sheet module feeding vibration disc 49, a multi-functional riveting press 50, a multi-functional riveting press test device 51, a release connecting piece function test device 52, a center pin function test device 53, a discharging track 54, and a third rotating disc 55, wherein the center pin and connecting piece pin riveting press 44, the release pin feeding vibration disc 45, the center pin feeding vibration disc 46, the threaded stud feeding vibration disc 47, the adjustment sheet fixing pin feeding vibration disc 48, the adjustment sheet module feeding vibration disc 49, the multi-functional riveting press 50, the multi-functional riveting press test device 51, the release connecting piece function test device 52, the center pin function test device 53, and the discharging track 54 are connected to corresponding stations at specified positions on the third rotating disc 55; and the third rotating disc 55 is provided thereon with a plurality of jigs for placing materials and semi-finished products, and drives the materials or semi-finished products in the jigs to rotate to the next station. The third rotating disc 55 is further provided with a connecting piece module and main body bracket module feeding station 41, a cover plate bracket, main body connecting piece and center pin feeding station 42, and a spring spin, release connecting piece and release spring feeding station 43. The center pin and connecting piece pin riveting press 44 comprises a displacement sensor, a proximity sensor, and a hard limit device.

The shaft sleeve press-fit detector 14, the adjustment sheet fixing pin press-fit detector 24, the riveting press and lock-fit detection device 36, and the multi-functional riveting press test device 51 are all provided with a CCD imaging visual system, a displacement sensor, and a pressure sensor.

Figure 1:
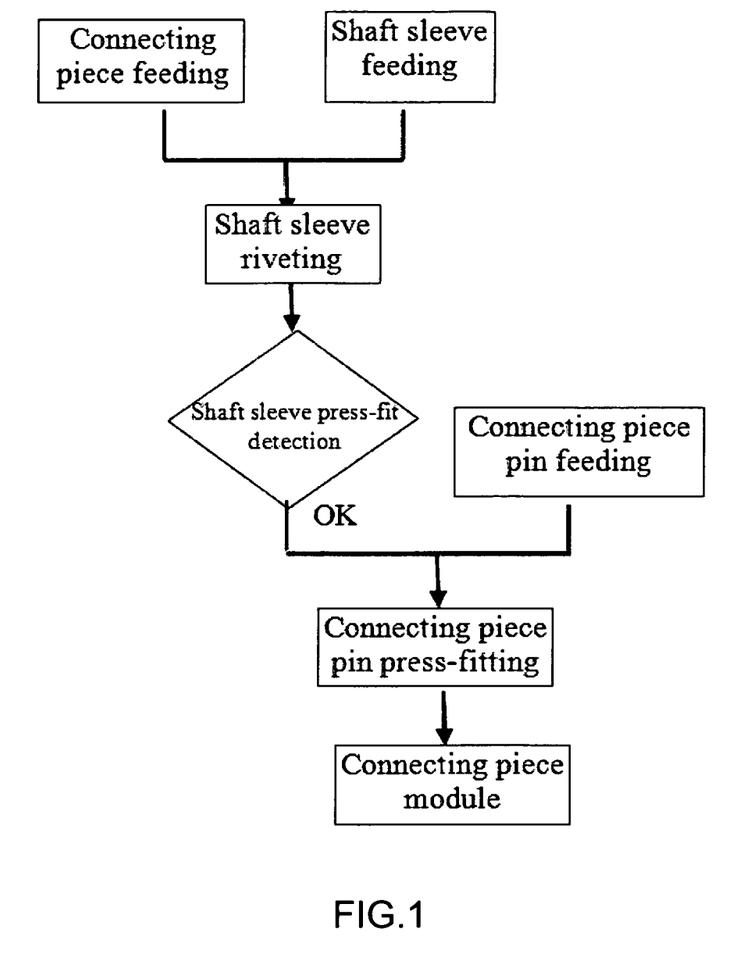
FIG. 1 is a flow chart of a process for assembling the connecting piece module.

The hinge assembly operation process of the device for automatically assembling a hinge of the present invention is as follows:

With reference to FIGS. 1 and 2, a shaft sleeve, a connecting piece, and a connecting piece pin are respectively fed to the shaft sleeve feeding vibration disc 11, the connecting piece feeding vibration disc 12, and the connecting piece pin feeding press-fit device 15; the shaft sleeve and the connecting piece are conveyed to the jigs of the first rotating disc 17; with the rotation of the first rotating disc 17, the shaft sleeve and the connecting piece are driven to the shaft sleeve riveting press 13; the shaft sleeve riveting press 13 rivets a bearing sleeve on the connecting piece, and then puts the semi-finished connecting piece back in the first rotating disc 17; with the rotation of the first rotating disc 17, the semi-finished connecting piece module is driven to the shaft sleeve press-fit detector 14; the shaft sleeve press-fit detector 14 detects the riveting press effect via a CCD, a high precision displacement sensor, and a pressure sensor; the qualified semi-finished connecting piece module enters the connecting piece pin feeding press-fit device 15 with the rotation of the first rotating disc 17; the connecting piece pin feeding press-fit device 15 installs the connecting piece pin in the semi-finished connecting piece module; finally, a connecting piece module is assembled completely, and the completely assembled connecting piece module is discharged from the connecting piece module discharging track 16.

Figure 3:
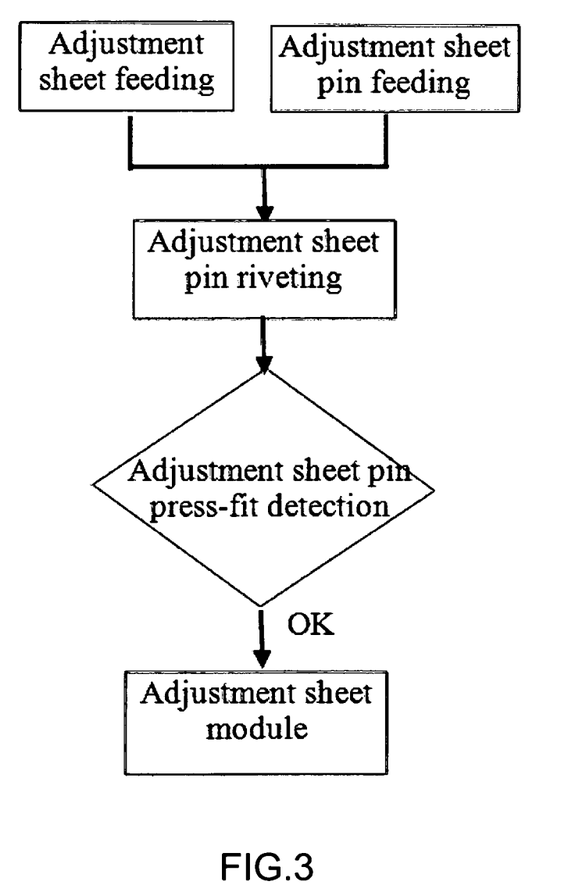
FIG. 3 is a flow chart of a process for assembling the adjustment sheet module.

With reference to FIGS. 3 and 4, an adjustment sheet and an adjustment sheet fixing pin are respectively fed to the adjustment sheet feeding vibration disc 22 and the adjustment sheet fixing pin feeding vibration disc 21; the adjustment sheet feeding vibration disc 22 and the adjustment sheet fixing pin feeding vibration disc 21 drives the adjustment sheet and the adjustment sheet fixing pin to enter the adjustment sheet fixing pin riveting press 23; the adjustment sheet fixing pin riveting press 23 rivets the adjustment sheet fixing pin on the adjustment sheet; then the adjustment sheet fixing pin press-fit detector 24 detects the riveting press effect via the high precision displacement sensor and the pressure sensor; finally, a normal adjustment sheet module is assembled completed, and the completely assembled adjustment sheet module is discharged from the adjustment sheet module discharging track 25.

Figure 5:
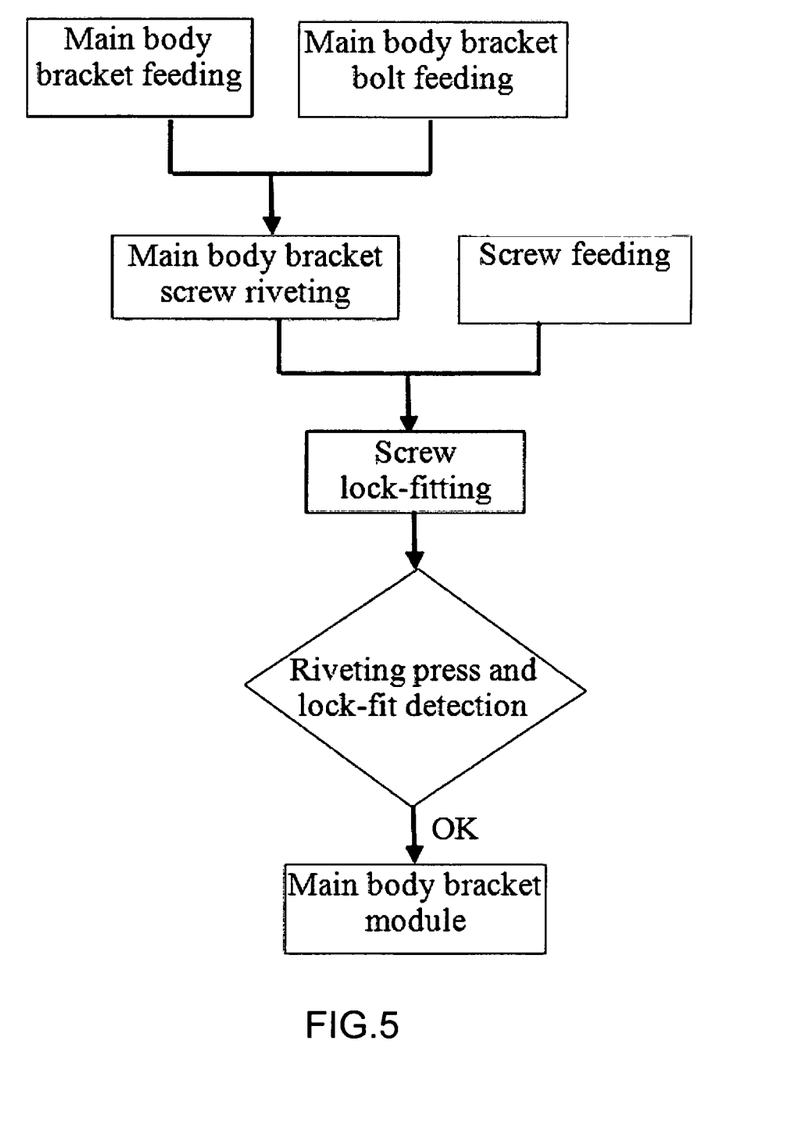
FIG. 5 is a flow chart of a process for assembling the main body bracket module.

With reference to FIGS. 5 and 6, a main body bracket, a main body bracket rivet, and a screw are respectively fed to the main body bracket feeding device 31, the main body bracket rivet feeding vibration disc 32, and the screw feeding vibration disc 34; the main body bracket and the main body bracket rivet enter the main body bracket rivet riveting press 33; the main body bracket rivet riveting press 33 rivets the main body bracket rivet on the main body bracket; then the main body bracket enters the screw lock-fitting device 35; the cuspidate guide mechanism installs the screw in a fixture; the electric screwdriver completes the lock-fit of the electric screwdriver; the riveting press and lock-fit detection device 36 detects riveting press quality and whether the bolt is tightly locked; and finally, a normal main body bracket module is discharged from the main body bracket module discharging track 37.

Figure 7:
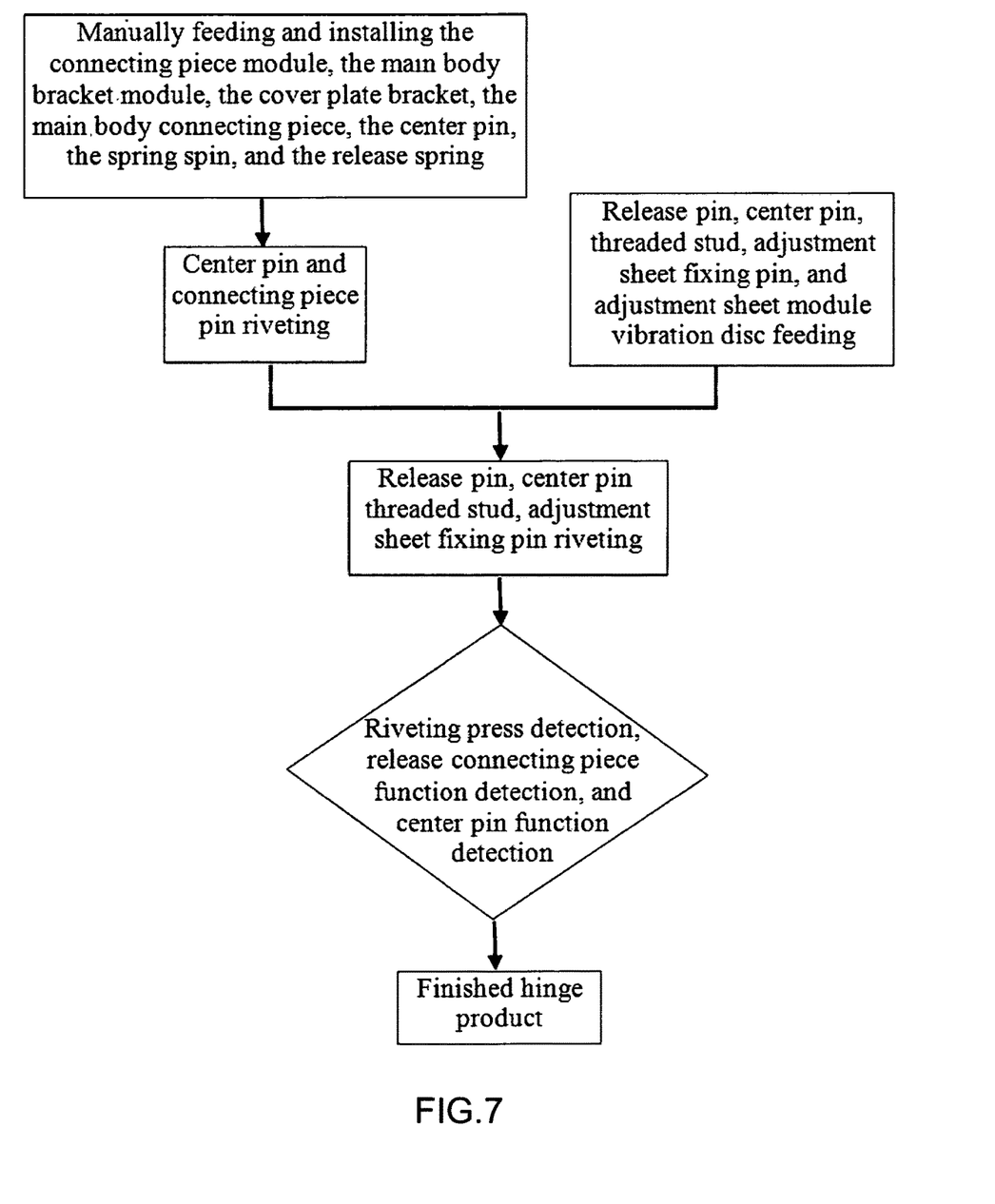
FIG. 7 is a flow chart of a process for assembling a finished hinge product.

With reference to FIGS. 7 and 8, a release pin, a center pin, a threaded stud, an adjustment sheet fixing pin, and an adjustment sheet module are respectively fed to the release pin feeding vibration disc 45, the center pin feeding vibration disc 46, the threaded stud feeding vibration disc 47, the adjustment sheet fixing pin feeding vibration disc 48, and the adjustment sheet module feeding vibration disc 49; the connecting piece module, the main body bracket module, the cover plate bracket, the main body connecting piece, the center pin, the spring pin, and the release spring are manually fed and installed at the connecting piece module and main body bracket module feeding station 41, the cover plate bracket, main body connecting piece and center pin feeding station 42, and the spring spin, release connecting piece and release spring feeding station 43; the installed semi-finished product enters the center pin and connecting piece pin riveting press 44 to rivet the center pin and the connecting piece pin, and then enters the multi-functional riveting press 50 to rivet the release pin, the center pin, the threaded stud, and the adjustment sheet fixing pin; and finally, a hinge is assembled completely. The multi-functional riveting press test device 51 detects the riveting press quality of the release pin, the center pin, the threaded stud, and the adjustment sheet fixing pin; then the release connecting piece function test device 52 and the center pin function test device 53 simulate a real use environment to detect the functions of the release connecting pieces and the center pin; and finally a normal hinge is discharged from the discharging track 54.

The description above is only an embodiment of the present invention, but should not be considered as a limitation of the protection scope of the present invention due to the specific and detailed description thereof. It should be pointed out that an ordinarily person skilled in the art could make various variations and improvements without departing from the concept of the present invention. And the obvious substitutions are all concluded in the protection scope of the present invention.

What is claimed is:

1. A device for automatically assembling a hinge, characterized by: comprising a connecting piece module assembly device, an adjustment sheet module assembly device, a main body bracket module assembly device, and a finished hinge product assembly device, wherein the connecting piece module assembly device is used for assembling a connecting piece, a shaft sleeve, and a connecting piece pin into a connecting piece module the adjustment sheet module assembly device is used for riveting an adjustment sheet and an adjustment sheet pin into an adjustment sheet module; the main body bracket module assembly device is used for assembling a main body bracket, a main body bracket bolt, and a screw into a main body bracket module; and the high finished product assembly device is used for assembling the connecting piece module, the adjustment sheet module, the main body bracket module, and other materials into a finished hinge product; the connecting piece module assembly device comprises a shaft sleeve feeding vibration disc (11), a connecting piece feeding vibration disc (12), a shaft sleeve riveting press (13), a shaft sleeve press-fit detector (14), a connecting piece pin feeding vibration disc (15), a connecting piece module discharging track (16), and a first rotating disc (17) wherein the shaft sleeve feeding vibration disc (11), the connecting piece feeding vibration disc (12), the shaft sleeve riveting press (13), the shaft sleeve press-fit detector (14), the connecting piece pin feeding vibration disc (15), and the connecting piece module discharging track (16) are all connected to the first rotating disc (17); and the first rotating disc (17) is provided thereon with a plurality of jigs.

2. The device for automatically assembling a hinge according to claim 1, characterized in that the: the adjustment sheet module assembly device comprises an adjustment sheet fixing pin feeding vibration disc (21), an adjustment sheet feeding vibration disc (22), an adjustment sheet fixing pin riveting press (23), an adjustment sheet fixing pin press-fit detector (24), and an adjustment sheet module discharging track (25), wherein the fixing pin feeding vibration disc (21), the adjustment sheet feeding vibration disc (22), the adjustment sheet fixing pin press-fit detector (24), and the adjustment sheet module discharging track (25) are all connected to the adjustment sheet fixing pin riveting press (23).

3. The device for automatically assembling a hinge according to claim 2, characterized in that: the main body bracket module assembly device comprises a main body bracket feeding device (31), a main body bracket rivet feeding, vibration disc (32), a main body bracket rivet riveting press (33), a screw feeding vibration disc (34), a screw lock-fitting device (35), a riveting press and lock-fit detection device (36), a main body bracket module discharging track (37), and a second rotating disc (38), wherein the bracket feeding device (31), the main body bracket rivet feeding vibration disc (32), the main body bracket rivet riveting press (33), the screw feeding vibration disc (34), the screw lock-fitting device (35), the riveting press and lock-fit detection device (36), and the main body bracket module discharging track (37) are all connected to the second rotating disc (38); and the second rotating disc (38) is provided thereon with a plurality of jigs.

4. The device for automatically assembling a hinge according to claim 3, characterized in that: the finished hinge product assembly device comprises a center pin and connecting piece pin riveting press (44), a release pin feeding vibration disc (45), a center pin feeding vibration disc (46), a threaded stud feeding vibration disc (47), an adjustment sheet fixing pin feeding vibration disc (48), an adjustment sheet module feeding vibration disc (49), a multi-functional riveting press (50), a multi-functional riveting press test device (51), a release connecting piece function test device (52), a center pin function test device (53), a discharging track (54), and a third rotating disc (55), wherein the center pin and connecting piece pin riveting press (44), the release pin feeding vibration disc (45), the center pin feeding vibration disc (46), the threaded stud feeding vibration disc (47), the adjustment sheet fixing pin feeding vibration disc (48), the adjustment sheet module feeding vibration disc (49), the multi-functional riveting press (50), the multi-functional riveting press test device (5 the release connecting piece function test device (52), the center pin function test device (53), and the discharging track (54) are all connected to the third rotating disc (55); and the third rotating disc (55) is provided thereon with a plurality of jigs.

5. The device for automatically assembling a hinge according to claim 4, characterized in that: the third rotating disc (55) is further provided with a plurality of feeding stations; the feeding stations are used for feeding the connecting piece module, the main body bracket module, a cover plate bracket, a main body connecting piece, the center pin, a spring pin, a release connecting piece, and a release spring.

6. The device for automatically assembling a hinge according to claim 4, characterized in that: the shaft sleeve press-fit detector (14), the adjustment sheet fixing pin press-fit detector (24), the riveting press and lock-fit detection device (36), and the multi-functional riveting press test device (51) are all provided with a CCD imaging visual system, a displacement sensor, and a pressure sensor.

7. The device for automatically assembling a hinge according to claim 3, characterized in that: the screw lock-fitting device (35) comprises a fixture, a cuspidate guide mechanism, and an electric screwdriver, wherein the cuspidate guide mechanism installs a screw into the fixture; and the electric screwdriver completes the lock-fit of the electric screwdriver.

8. The device for automatically assembling a hinge according to claim 4, characterized in that: the center pin and connecting piece pin riveting press (44) comprises a displacement sensor, a proximity sensor, and a hard limit device.

* * * * *